Patented Nov. 19, 1935

2,021,864

UNITED STATES PATENT OFFICE 2,021,864

MANUFACTURE OF SHAPED ARTIFICIAL STRUCTURES

Leon Lilienfeld, Vienna, Austria

No Drawing. Application March 7, 1931, Serial No. 521,020. In Great Britain March 15, 1930

3 Claims. (Cl. 18—54)

This invention is a modification of that described in specification Serial No. 435,649.

In that specification I have described a manufacture of artificial threads or other products, wherein a product of the action of a halogen derivative of a di- or poly-hydric alcohol on viscose is brought into the appropriate shape or form and acted upon with an agent which has a coagulating effect on the shaped material and a plasticizing effect on the freshly coagulated material. Instead of a halogen derivative of a di- or poly-hydric alcohol there may be used in the said manufacture a halogen fatty acid, as described in my specification Ser. No. 464,425, or a trithiocarbonic acid ester as described in my specification Ser. No. 464,427.

As a variant of the operation, as described in said prior cases, the shaped material may be treated first with an agent which has the coagulating effect and then with an agent which has the plasticizing effect.

The products of the manufacture are remarkable in that they unite in themselves three important properties, namely:—sufficiently high lustre, very high tenacity in the dry and wet state, and, notwithstanding that, a degree of extensibility sufficient for all practical purposes.

My further investigations have now shown that instead of the reagents prescribed in the aforesaid specifications there may be used in the process of manufacture described in the specification Ser. No. 435,649 other reagents which by interaction with cellulose or alkali cellulose are capable of yielding cellulose compounds (for example ethers or ether-like linked compounds) in which one or more of the hydroxyl hydrogen atoms of the cellulose molecule are replaced by groups or radicals, and that this effect is experienced in the case of so many compounds of such varied chemical composition, particularly etherifying agents and esterfying agents, that the present invention may be defined in the following terms:—

A process of manufacture of artificial threads or other shaped artificial structures, wherein a product of the action on viscose of a reagent (except a halogen derivative of a di- or poly-hydric alcohol or of a fatty acid, or a trithiocarbonic acid ester) which by interaction with cellulose or alkali cellulose is capable of yielding cellulose compounds (for example ethers or ether-like compounds) in which one or more of the hydroxyl hydrogen atoms of the cellulose molecule are replaced by groups or radicals, is brought into the appropriate shape or form and acted upon with an agent which has a coagulating effect on the shaped material and a plasticizing effect on the freshly coagulated material, or first with an agent which has a coagulating effect on the shaped material and then with an agent which has a plasticizing effect on the freshly coagulated material.

The following is a list of illustrations of substances that may be used, but the invention is not restricted to these illustrative substances.

Halogen olefines, namely: (unsaturated halogen derivatives of unsaturated hydrocarbons).

Di- or poly-halogen-paraffins.

Hydrohaloid acid esters of monohydric alcohols (namely mono-halogen paraffins or aralkyl halides, including benzyl chloride) or halogen derivatives of ethers of mono-hydric alcohols, or haogen derivatives of aldehydes or ketones which may be regarded as being derived from mono-hydric alcohols.

Halogen alkylamines or halogen aralkylamines.

Acid halides, such as benzoyl halides.

Sulphochlorides of hydrocarbons, such as ortho- or para-toluene sulphochloride, naphthalene sulphochloride.

Quinoline sulphochloride.

Halogen derivatives of substituted benzoylated chloranisol.

Halogen derivatives of ethers of amino-phenols, such as chloro-anisidine or O- or N-substitution derivatives thereof.

Halogen derivatives of pseudophenols, methylene quinones and quinols, for example ortho-oxymesityl chloride or piperonyl chloride.

Sulphochlorides of tertiary amines.

Sulphochlorides of salicylic acid and chloro- or nitro-substitution products thereof, and sulphonamide.

Halogen derivatives of aromatic monocarboxylic acids.

Halogen derivatives of cyanogen, such as cyanogen halides, or cyanuric halides (tricyanogen halides).

Halogen derivatives of nitrobenzene.

Urea halides, alkylurea halides, phenylurea halides and phenylalkylurea halides.

Phenyl-halogen fatty acids (for example phenyl-chloracetic acid or phenyl-chloro-propionic acid or phenyl-chloro-lactic acid or phenyl-chloro-oxypropionic acid) or their homologues.

Halogen derivatives of mono-hetro-cyclic ring compounds containing one nitrogen atom in a six-unit ring, for example halogen derivatives of pyridine or its homologues or halogen derivatives of quinoline or its homologues or halogen derivatives of isoquinoline or its homologues.

Halogen derivatives of phenyl olefine alcohols or oxyphenyl olefine alcohols, for example cinnamic alcohol dibromide.

Halogen derivatives of olefine benzene, for example ω-chlorostyrol or dichlorostyrol.

Halogen hydracid esters of phenyl glycols, for example β-phenyl-propylene-glycol-α-chlorhydrin or benzyl-glycol-chlorhydrine or styrol dichloride.

The process is carried out like that of Specification Ser. No. 435,649 the difference being that another halogen compound of the kind herein defined is substituted for a halogen derivative of a di- or polyvalent alcohol.

Since the practice of the process is exactly as set forth in the aforesaid parent application 435,649 and explained therein by aid of numerous examples, it appears superfluous to repeat here all particulars relating to the carrying out of the present process under various working conditions and to give here examples demonstrating all possible modifications of working the present invention. In conjunction with the detailed description and the examples of Specification Ser. No. 435,649, the following examples appear to be sufficient to illustrate the practical execution of the invention which, however, is by no way limited to these examples.

*Example I (a) to (h)*

(a) 100 parts of wood pulp (water content= 8 per cent.) or cotton linters (water content= 6–7 per cent.) are introduced into 2000 parts of caustic soda solution of 18 per cent. strength at 15° C. and allowed to remain therein for 3 hours; the alkali cellulose is then pressed until, in the case of wood pulp it weighs 300 parts and in the case of linters 340 parts, and is then comminuted at 11–15° C. during 2½–3 hours; in the case of wood pulp 40 parts and in the case of linters 60 parts of carbon disulphide are added and the carbon disulphide is allowed to act for 8 hours at 18–20° C.; any excess of carbon disulphide is then blown off during 10–15 minutes, and the xanthate thus obtained is dissolved by using so much caustic soda and water that the solution obtained contains about 6.5 per cent. of cellulose determinable analytically and 5 per cent of NaOH.

When the dissolution is complete, 100 parts of acetylene-di-chloride (sym.di-chlorethylene) are added to the viscose, and well stirred in, and the solution is then filtered three times through cotton, two filtrations being carried out soon after its preparation, while the third immediately preceeds the spinning process. Before this spinning solution is spun, it is left to age for 96 to 100 hours at a temperature of 15° C. During ageing, the reaction mixture is temporarily (say, for four hours every day) stirred. The spinning is as follows:—

The spinning solution is pressed at a speed of 3.3 c. c. per minute through a platinum nozzle having 54 perforations of 0.1 mm. diameter, into a bath containing 65 to 70 per cent. of $H_2SO_4$ and having a temperature of 16° C., the length of immersion of the thread in the sulphuric acid being 20 cm. The thread is then allowed to pass for 120 cm. through the air and is wound on a bobbin revolving at a speed which produces a speed of spinning of about 18 m. per minute. Three glass rods are placed angularly to one another between the spinning bath and the bobbin over which the threads are conducted and are thus subjected to an additional stretching or tension. The lower part of the bobbin revolves in water, so that the sulphuric acid is removed or considerably diluted as soon as the thread arrives at the bobbin. The threads are then washed, purified, twisted and finished in the usual manner.

The threads obtained consist of single filaments of about 2 to 2.5 deniers each.

(b) The same mode of operation as in (a), but with the variation that the temperature of the spinning bath is —5° C.

(c) The same mode of procedure as in (a), but with the difference that 3 c. c. of the spinning solution are discharged per minute, that the nozzles have 24 perforations of 0.1 mm. diameter, that the setting bath contains 60 to 66 per cent. of $H_2SO_4$ and has a temperature of 0° C., and that the length of immersion of the thread in the setting bath is 80 cm.

The titre of the single filaments is about 4 to 5.5 denier.

(d) The same mode of procedure as in (a) or (b), but with the exception that 6.2 c. c. of the spinning solution are discharged per minute, that the nozzles have 100 perforations of 0.08 mm. diameter and that the speed of spinning is 40 m. per minute and that the strength of the spinning acid is 65 to 70 per cent. of $H_2SO_4$.

The titre of the single filaments is about 1 to 1.4 denier.

(e) The process is conducted as in (a) or (b) but with the difference that 3 c. c. of the spinning solution are discharged per minute, that the nozzles have 100 apertures of 0.08 mm. diameter, that the speed of spinning is 30 m. per minute and that the strength of the sulphuric acid is 62 to 66 per cent. of $H_2SO_4$.

(f) Mode of operation as in (a) or (b), but with the difference that only 1.6 c. c. of the spinning solution is discharged per minute and that the nozzles have 100 perforations of 0.08 mm. diameter and that the strength of the sulphuric acid is 62 to 66 per cent. of $H_2SO_4$.

(g) The process is conducted as in (d) but with the difference that the spinning solution is charged at a speed of about 14 c. c. per minute, that the speed of spinning is about 100 to 120 m. per minute, that the thread is not subjected to additional stretching and that the length of immersion is 80 to 100 cm.

(h) The same procedure as in (a) to (g) with the exception that the setting bath contains 40 per cent. of $H_2SO_4$.

(This example is generally similar to Example I of Ser. No. 435,649, except that in said example 20 parts of α dichlorhydrine are used, while in this example 100 parts of acetylene dichloride are employed.)

*Example II (a) to (h)*

Mode of procedure as in any one of the Examples I (a) to (h), but with the difference that, instead of acetylene dichloride, 125 parts of trichlorethylene are employed.

*Example III (a) to (h)*

The process is conducted as in any one of the Examples I (a) to (h), but with the difference that, instead of the acetylene di-chloride, 80 parts of vinyl-chloride are added to the viscose.

The concentrations of the spinning acids are as follows:—

Spinning method (a) or (b): 62 to 69 per cent. of $H_2SO_4$.

Spinning method (c): 58 to 65 per cent. of H₂SO₄.

Spinning method (d) and (g): 60 to 68 per cent. of H₂SO₄.

Spinning method (e): 58 to 64 per cent. of H₂SO₄.

Spinning method (f): 59 to 66 per cent. of H₂SO₄.

Spinning method (h): 40 per cent. of H₂SO₄.

Example IV (a) to (h)

The process is conducted as in any one of the Examples I (a) to (h), but with the difference that, after the sulphidizing step, the cellulose xanthate is dissolved in such a quantity of caustic soda and water as to yield a viscose containing about 6.5 per cent. of analytically determinable cellulose and 8 per cent. of NaOH and that 150 parts of acetylene-di-chloride are added to the viscose.

Example V (a) to (h)

The process is conducted as in any one of the Examples I (a) to (h), but with the difference that, instead of the acetylene-dichloride, 120 parts of tetra-chlorethylene are added to the viscose.

Example VI (a) to (h)

The process is conducted as in any one of the Examples I (a) to (h), but with the difference that, instead of the acetylene dichloride, 80 parts of allylchloride (γ-chlorpropylene) are employed.

Example VII (a) to (h)

The process is conducted as in any one of the Examples I (a) to (h), or IV (a) to (h), but with the exception that, instead of the acetylene-dichloride, 100 parts of α-γ-di-chlorpropylene (β-epidichlorhydrin) are added to the viscose.

Example VIII (a) to (h)

To a viscose prepared exactly as in Example I (a), immediately after the dissolution 100 parts of ethylene chloride are added under mechanical stirring or kneading, and the stirring continued for 4 hours. Before spinning, the thus obtained solution is allowed to age for 100 to 110 hours and during that time is stirred every day for about 4 hours. On the day preceding the spinning, the solution is filtered three times through cotton wool and then spun as in any one of the Examples I (a) to (h) the strength of the spinning acids being as follows:—

Spinning method (a) and (b): 68 to 71 per cent. H₂SO₄.

Spinning method (d): 61 to 64 per cent. H₂SO₄.

Spinning method (e): 62 to 66 per cent. H₂SO₄.

Spinning method (f) and (g): 61 to 64 per cent. H₂SO₄.

Spinning method (c): 62 to 66 per cent. H₂SO₄.

Spinning method (h): 40 per cent. H₂SO₄.

Example IX (a) to (i)

The procedure is as in any one of the Examples VIII (a) to (i), with the exception that, instead of the 100 parts, 50 parts of ethylene chloride are employed.

Example X (a) to (i)

Mode of procedure as in any one of the Examples VIII (a) to (i), but with the difference that, instead of the 100 parts of ethylene chloride, 112 parts of propylene chloride are employed.

Example XI (a) to (i)

Mode of procedure as in any one of the Examples VIII (a) to (i), with the exception that instead of the 100 parts of ethylene chloride, 100 to 150 parts of trimethylene chloride $$(CH_2Cl \cdot CH_2 \cdot CH_2 \cdot Cl)$$

are employed.

Example XII (a) to (i)

The process is conducted as in any one of the Examples VIII (a) to (i), but with the difference that, instead of the 100 parts of ethylene chloride, 120 parts of methylene chloride are employed.

Example XIII (a) to (i)

Procedure as in any one of the Examples VIII (a) to (i), with the difference that, instead of the 100 parts of ethylene chloride, 100 parts of ethylidenechloride are used.

Example XIV (a) to (i)

The process is conducted as in any one of the Examples XIII (a) to (i), but with the difference that, instead of ethylidenechloride, 115 parts of propylidenechloride are employed.

Example XV (a) to (i)

The process is conducted as in any one of the Examples XIII (a) to (i), but with the difference that, instead of ethylidenechloride, 120 parts of isopropylidenechloride are employed.

Examples XVI (a) to (i)

The process is conducted as in any one of the Examples XIII (a) to (i), but with the difference that, instead of ethylidenechloride, 160 parts of tetrachlorethane (acetylene tetrachloride) are employed.

Example XVII (a) to (i)

The process is conducted as in any one of the Examples XIII (a) to (i) but with the difference that, instead of ethylidenechloride, 200 parts of pentachlorethane are employed.

Example XVIII (a) to (i)

Procedure as in any one of the preceding Examples, with the difference that 2 parts of copper acetate or zinc acetate dissolved in 5 parts of water are added under stirring to the viscose before the addition of the halogen derivative.

Example XIX (a) to (h)

Mode of procedure as in any of the Examples I (a) to (h) but with the difference that, instead of acetylene-dichloride, 50 to 100 parts of ethyl iodide or methyl iodide are added to the viscose.

The concentrations of the spinning acids are as follows:—

Spinning method (a) and (b): 61 to 64 per cent of H₂SO₄.

Spinning method (c): 58 to 62 per cent of H₂SO₄.

Spinning method (d): 61 to 64 per cent of H₂SO₄.

Spinning method (e): 58 to 61 per cent of H₂SO₄.

Spinning method (g): 61 to 64 per cent of H₂SO₄.

Spinning method (h): 40 per cent of H₂SO₄.

In this example the spinning solution (reaction product of viscose with the alkyl iodide) may be allowed to age for 60 hours, if desired.

Example XX (a) to (h)

The process is conducted as in any one of the Examples XIX (a) to (h), but with the difference, that, after the sulphidizing step, the cellulose xanthate is dissolved in such a quantity of caustic soda and water as to yield a viscose containing about 6.5 per cent. of analytically determinable cellulose and 5 per cent. of NaOH and that only 40 to 50 parts of the methyl iodide or ethyl iodide are added to the viscose.

*Example XXI (a) to (h)*

The process is conducted as in any one of the Examples XIX (a) to (h) or XXI (a) to (h), but with the difference that, instead of the alkyl iodide, 60 to 100 parts of benzyl chloride are added to the viscose and that, before adding the benzyl chloride, 2 parts of copper acetate dissolved in 30 c.c. of water are incorporated with the viscose under stirring.

*Example XXII (a) to (h)*

The process is conducted as in ony one of the Examples XIX (a) to (h), but with the difference that, instead of the alkyl iodide, 30 parts of 1:2-dichlorether are added to the viscose, the concentration of the spinning acids used in spinning methods (a) to (e) being 60 to 70 per cent. of $H_2SO_4$.

*Example XXIII (a) to (h)*

Mode of operation as in any one of the Examples XXII (a) to (h), but with the exception that, instead of 30 parts, 40 parts of 1:2-dichlorether are employed.

*Example XXIV (a) to (h)*

Mode of operation as in any one of the Examples XXII (a) to (h), but with the exception that, instead of 30 parts, 80 parts of 1:2-dichlorether are employed.

*Example XXV (a) to (h)*

The process is conducted as in any one of the Examples XIX (a) to (h), but with the difference that instead of the alkyl iodide, 30 parts of 1:2-dichlorether are used, and that the spinning solution is allowed to age for 48 hours, the concentrations of the spinning acids used in the spinning methods (a) to (e) being 69 to 73 per cent. of $H_2SO_4$.

*Example XXVI (a) to (h)*

The process is conducted as in any one of the Examples XIX (a) to (h), but with the difference that, instead of the alkyl iodide, 20 to 30 parts of dichloracetaldehyde are used.

*Example XXVII (a) to (h)*

The process is conducted as in any one of the Examples XXII (a) to (h), but with the difference that instead of 1:2-dichlorether, 20 to 30 parts of chloracetone are used.

*Example XXVIII (a) to (h)*

The process is conducted as in any one of the Examples XXVI (a) to (h), but with the difference that instead of the 1:2-dichlorether, 20 to 30 parts of brompinacoline are used.

The brompinacoline has the tendency towards forming a flocculent precipitate in the viscose. The mixture must therefore be vigorously stirred.

*Example XXIX (a) to (h)*

Mode of procedure as in any one of the Examples I (a) to (h), but with the difference that, instead of acetylene dichloride 50 to 60 parts of β-brompropylamine hydrobromide are added to the viscose.

The concentrations of the spinning acids are as follows:—

Spinning method (a) and (b): 60 to 70 per cent of $H_2SO_4$.
Spinning method (c): 58 to 65 per cent of $H_2SO_4$.
Spinning method (d): 60 to 70 per cent of $H_2SO_4$.
Spinning method (e): 56 to 66 per cent of $H_2SO_4$.
Spinning method (f): 55 to 64 per cent of $H_2SO_4$.
Spinning method (g): 66 to 70 per cent of $H_2SO_4$.
Spinning method (h): 40 per cent of $H_2SO_4$.

*Example XXX (a) to (h)*

The process is conducted as in any one of the Examples XXIX (a) to (h), but with the difference that instead of 50 to 60 parts, 100 parts of β-brompropylamine hydrobromide are added to the viscose and that before spinning the reaction mixture is allowed to age for about 40 hours only.

*Example XXXI (a) to (h)*

The process is conducted as in any one of the Examples XXIX (a) to (h), but with the difference that, after the sulphidizing step, the cellulose xanthate is dissolved in such a quantity of caustic soda and water as to yield a viscose containing about 6.5 per cent. of analytically determinable cellulose and 5 per cent. of NaOH and that 30 parts of α-brompropylamine hydrobromide are added to the viscose.

*Example XXXII (a) to (h)*

The process is conducted as in any one of the Examples XXIX (a) to (h), but with the difference, that instead of the β-brompropylamine hydrobromide, 40 to 50 parts of bromethylamine hydrobromide are added to the viscose.

*Example XXXIII (a) to (h)*

The process is conducted as in any one of the Examples XXXI (a) to (h), but with the difference that, instead of the β-brompropylamine hydrobromide, 30 parts of bromethylamine hydrobromide are employed.

*Example XXXIV (a) to (h)*

The process is carried out as in any one of the preceding examples, but with the difference that, before entering the strong sulphuric acid, the thread-like stream is conducted through one of the following baths:

(1) a solution of ammonium sulphate of 25 to 30 per cent. strength, or (2) a bath consisting of 500 parts of sodium bisulphate, 76 parts of sulphuric acid of 66° Bé., and 587 parts of water, which bath may be kept at room temperature or at a raised temperature, for instance 50° C., or (3) a bath consisting of 982 parts of water, 180 parts of sodium sulphate, 60 parts of ammonium sulphate, 15 parts of zinc sulphate, 135 parts of glucose, and 128 parts of sulphuric acid of 66° Bé.

*Example XXXV*

The process is conducted as in any of the Examples I (a) to (h), but with the difference that instead of the acetylene di-chloride, 50 to 80 parts of chlorethyldiethylamino-chlorohydrate dissolved in a small amount of water are employed. Also in this example, I may use as the starting material, wood pulp or cotton linters of the kinds which yield a viscose of relatively high viscosity, particularly in those modifications of the process in which a rather small amount of cellulose (viz. below 5%), is to be contained in the viscose. Or, I may so regulate the proportions that the viscose initially contains about 6.5% of cellulose (determinable by analysis) and about 8% of NaOH.

*Example XXXVI*

The process is conducted as in any of the Examples I (a) to (h), but with the difference that instead of the acetylene di-chloride, 50 to 90 parts of β-chloropropylaminochlorohydrate are employed, the concentration of the spinning acid being somewhat (for example 2 to 6 per cent.) lower than in Example I (a) to (i) of the parent application. Also in this example, I may use as the starting material, wood pulp or cotton linters of the kind which yield a viscose of relatively high viscosity, particularly in those modifications of the process in which a rather small amount of cellulose (viz. below 5%), is to be contained in the viscose. Or, I may so regulate the proportions that the viscose initially contains about 6.5% of cellulose (determinable by analysis) and about 8% of NaOH.

*Example XXXVII*

The process is conducted as in any of the Examples I (a) to (h), but with the difference that instead of the acetylene di-chloride, 40 to 60 parts of ortho-chlorobenzoic acid in the form of its sodium salt (dissolved in a small amount of water) are employed. Also in this example, I may use as the starting material, wood pulp or cotton linters of the kinds which yield a viscose of relatively high viscosity, particularly in those modifications of the process in which a rather small amount of cellulose (viz. below 5%), is to be contained in the viscose. Or, I may so regulate the proportions that the viscose initially contains about 6.5% of cellulose (determinable by analysis) and about 8% of NaOH.

*Example XXXVIII*

The process is conducted as in any of the Examples I (a) to (h), but with the difference that instead of the acetylene di-chloride, 50 to 120 parts of cyanogen cyloride, or 60 to 150 parts of cyanogen bromide, or 30 to 100 parts of cyanuric chloride are employed. Also in this example, I may use as the starting material, wood or pulp or cotton linters of the kinds which yield a viscose of relatively high viscosity, particularly in those modifications of the process in which a rather small amount of cellulose (viz. below 5%), is to be contained in the viscose. Or, I may so regulate the proportions that the viscose initially contains about 6.5% of cellulose (determinable by analysis) and about 8% of NaOH.

*Example XXXIX*

The process is conducted as in any of the Examples I (a) to (h), but with the difference that instead of the acetylene di-chloride, 40-100 parts of ortho-chloronitrobenzene are employed. Also in this example, I may use as the starting material, wood pulp or cotton linters of the kinds which yield a viscose of relatively high viscosity, particularly in those modifications of the process in which a rather small amount of cellulose (viz. below 5%), is to be contained in the viscose. Or, I may so regulate the proportions that the viscose initially contains about 6.5% of cellulose (determinable by analysis) and about 8% of NaOH.

*Example XL*

The process is conducted as in any of the Examples I (a) to (h), but with the difference that instead of the acetylene di-chloride, 20-60 parts of diazobenzenechloride are employed. Also in this example, I may use as the starting material, wood pulp or cotton linters of the kinds which yield a viscose of relatively high viscosity, particularly in those modifications of the process in which a rather small amount of cellulose (viz. below 5%), is to be contained in the viscose. Or, I may so regulate the proportions that the viscose initially contains about 6.5% of cellulose (determinable by analysis) and about 8% of NaOH.

*Example XLI*

The process is conducted as in any of the Examples I (a) to (h), but with the difference that instead of the acetylene di-chloride, 40-120 parts of phenyl-ethyl-urea chloride are employed. Also in this example, I may use as the starting material, wood pulp or cotton linters of the kinds which yield a viscose of relatively high viscosity, particularly in those modifications of the process in which a rather small amount of cellulose (viz. below 5%), is to be contained in the viscose. Or, I may so regulate the proportions that the viscose initially contains about 6.5% of cellulose (determinable by analysis) and about 8% of NaOH.

*Example XLII*

The process is conducted as in any of the Examples I (a) to (h), but with the difference that instead of the acetylene di-chloride, 60-150 parts of cinnamic alcohol dibromide (styrol-dibromide) dissolved in a small amount of alcohol, are employed. Also in this example, I may use as the starting material, wood pulp or cotton linters of the kinds which yield a viscose of relatively high viscosity, particularly in those modifications of the process in which a rather small amount of cellulose (viz. below 5%), is to be contained in the viscose. Or, I may so regulate the proportions that the viscose initially contains about 6.5% of cellulose (determinable by anaylsis) and about 8% of NaOH.

*Example XLIII*

The process is conducted as in any of the Examples I (a) to (h) but with the difference that instead of the acetylene di-chloride, 30 parts of dichloro-acetone are employed Instead of the viscose prepared as in Example I (a), I may use a viscose containing about 6.5% of cellulose (determinable by analysis) and about 8% of NaOH.

*Example XLIV*

A spinning solution, produced in the manner described in any one of the foregoing examples is introduced in the known manner in the form of a sheet, into any one of the plasticizing liquids named in any one of the foregoing examples through a suitable hopper or slit, and the coagulated film band, after having been run through this bath, is washed in the known manner and dried.

*Example XLV*

A cotton material is impregnated or filled, or coated, one or several times, on a suitable machine, for instance a padding machine, or a back-filling machine, or a spreading machine, with a spinning solution produced in the manner described in any one of the foregoing examples, to which solution a filling material such as talc or china clay (for instance 100 to 200 per cent. calculated on the weight of the cellulose) or a dyestuff or a pigment (such as mica, or lampblack) may be added and after, or without being dried, if necessary in a state of tension, is passed through a bath having the composition of any one of the plasticizing liquids mentioned in the foregoing examples. The dressed or coated fabric is then washed and dried.

In the foregoing examples in which chlorine derivatives are used the equivalent quantities of bromine or iodine derivatives may be substituted for the chlorine derivatives.

In Examples XXXIX to XXXIII instead of their salts the free bases may be used, and instead of the bromalkylamine, chloralkylamines or iodalkylamines may be used.

The spinning baths referred to above may also contain in addition to the $H_2SO_4$, about 10% of ammonium sulphate, or 5 to 7.5% of glucose. Hydrochloric acid of about 40 to 42% strength can be substituted for the sulphuric acid, or nitric acid of 60 to 90% strength, or phosphoric acid of 1.5 to 1.86 sp. gr. (49 to 67% strength) or arsenic acid of 60 to 90% $H_3AsO_4$ or 60% $ZnCl_2$ solution containing about 4 to 5% of HCl, may also be used in place of the $H_2SO_4$ baths, or in short any bath that has a plasticizing action on the freshly coagulated artificial material (e. g. thread).

*Example XLVI*

One of the spinning solutions produced according to any one of the foregoing prescriptions is spun in the known manner in one of the following baths:—

(1) In a solution of ammonium sulphate of 25 to 30 per cent strength.

(2) In a bath consisting of 500 parts of sodium bisulphate, 76 parts of sulphuric acid of 66° Bé. and 587 parts of water, which bath may be kept at room temperature or at a raised temperature, for instance 50° C., or (3) In a bath consisting of 982 parts of water, 180 parts of sodium sulphate, 60 parts of ammonium sulphate, 15 parts of zinc sulphate, 135 parts of glucose and 128 parts of sulphuric acid of 66° Bé.

The coagulated thread is introduced from one of the baths here cited into a bath of the following composition:—

(1) sulphric acid of 70 per cent of $H_2SO_4$ or
(2) sulphuric acid of 60 to 65 per cent of $H_2SO_4$ or (3) sulphuric acid of 45 to 55 per cent of $H_2SO_4$ or (4) a solution of 13.3 parts of ammonium sulphate in 120 parts by weight of sulphuric acid of 62 to 70 per cent of $H_2SO_4$, to which 9 to 10 parts of sulphuric acid of 66° Bé. are added.

(5) Hydrochloric acid of 40% strength.

The temperature of the second bath may be kept below room temperature, for instance at 0 to 10° C., or at room temperature, or even above room temperature, for instance at 25° to 45° C.

The length of immersion of the thread in the second bath may be small, for instance 20 cm. or also large, for instance 30 to 120 cm. or more.

If desired, the threads may be stretched by any one of the known methods, either in the second bath or after they have left it. This may be arranged by making the distance of the collecting device from the second setting bath very large, or by conducting the threads over one or several rods, hooks, rollers, or differential rollers, which are arranged between the nozzle and the collecting device in the second bath or outside it or at both places.

The threads are collected, while the sulphuric acid is removed or diluted by washing as has previously been described, and the threads are finally washed completely, dried and treated in the manner described in Example I.

In the foregoing examples, in order to obtain the additional stretching, differential rollers may also be used.

In all the foregoing examples the action of the acid may be interrupted also by subjecting the threads leaving the bath consisting of, or containing, strong acids, to a low temperature, for instance —5 to —15° C. before they are washed, which low temperature treatment for instance may be done by collecting it on a hollow spool containing a cooling agent, for instance solid carbonic acid, or a freezing mixture, or ice.

Details for the manufacture of staple fibre will readily be understood from the foregoing examples.

When the threads have been washed, they may be heated or steamed at high temperatures (for instance 100° to 110° C.) before or after the drying process.

Any desulphurization or bleaching of the threads may be conducted in the known manner.

In the foregoing examples, in the preparation of the viscose, instead of sulphite cellulose or linters there may be used cotton or wood-pulp which has been pretreated cold or hot with a dilute acid, for instance hydrochloric acid or sulphuric acid, in short any kind of cellulose material may be used which is used or has been proposed in the viscose art.

The foregoing examples may also be modified, in that the alkali cellulose, before being treated with carbon bisulphide, is allowed to ripen for a shorter period than stated in Example XXXVII (48 hours) for instance 24 or 36 hours, or longer, for instance 60 to 72 hours, and at a temperature of 15 to 20° C.

As stated above, irrespective of the origin of the cellulose used, the alkali cellulose may be matured or not, as desired in any particular case.

As a guiding line with regard to the question whether or not (in a particular case) the alkali cellulose should be allowed to mature before being brought together with the carbon bisulphide many, among others, serve the desired viscosity of the solution which is to be worked up into artificial material in general and artificial threads in particular, and in connection therewith the viscosity of the kind of cellulose contemplated. If it is desired to give the solution a definite viscosity, then the alkali cellulose produced from the kind of cellulose contemplated is subjected to a maturing process, if without maturing this kind of cellulose yields a higher viscosity. If, however, it exhibits from the first the desired grade of viscosity, that is without maturing, then the maturing would be superfluous and hence would be omitted. Now, as the viscosities of the different kinds of cellulose on the market (linters and wood-pulp) differ very much from one another, the question of maturing depends in most cases on the one hand on the viscosity desired of the initial solution intended for the manufacture of artificial material, and on the other hand on the viscosity of the kind of cellulose being worked.

The expression "viscose or cellulose xanthate" wherever the context permits includes cellulose xanthate or their solutions or their derivatives or solutions of cellulose xanthate derivatives.

The expression "artificial material" used in the specification and claims includes: Artificial threads, particularly artificial silk; films; coatings and layers of every kind; dressings for textiles, paper, leather and the like; sizing for yarns; book cloth; artificial leather; adhesives and cements; plates and shaped or partly shaped plastic compositions in general; thickening agents or fixing agents for pigments in textile printing and the like.

The term "artificial threads" denotes artificial threads and spun goods of all kinds, for instance artificial silk, staple fibre, artificial cotton, artificial wool, artificial hair, and artificial straw of any kind.

The expression "strong mineral acids" denotes sulphuric acid of at least 35 per cent of $H_2SO_4$, preferably at least 45 per cent of $H_2SO_4$, and as regards the other mineral acids, solutions of equivalent strength.

The expression "strong sulphuric acid" or "sulphuric acid containing at least about 35 per cent of sulphuric acid monohydrate" denotes sulphuric acid having a content of 35 to 98 per cent of $H_2SO_4$.

To avoid alternative expressions, the term "polyhydric alcohols" as used hereinafter is intended to embrace dihydric alcohols, and generally the prefix "poly-" is intended to embrace "di-".

What I claim is:—

1. A process of making shaped artificial structures which comprises the step of acting upon viscose with at least one halogen-containing organic reagent, other than a halogenhydrin or a halogen-fatty acid, which is capable of reacting upon viscose to cause the substitution of a hydroxyl hydrogen atom of the cellulose in said viscose by an organic radical, bringing the resulting xanthate solution into the shape of the artificial structure desired and coagulating the same and plasticizing the freshly coagulated artificial structure.

2. A process of producing shaped artificial structures which comprises acting on viscose with at least one of the herein described halogen-containing organic substances selected from the group consisting of:—

(a) halogen olefines namely unsaturated halogen derivatives of unsaturated hydrocarbons.
(b) mono-halogen and poly-halogen paraffins
(c) aralkyl halides, including benzyl chloride
(d) halogen derivatives of ethers of monohydric alcohols,
(e) halogen derivatives of aldehydes derived from monohydric alcohols.
(f) halogen derivatives of ketones derived from monohydric alcohols,
(i) halogen alkylamines,
(j) halogen aralkylamines,
(k) benzoyl halides and other halides of organic acid radicals,
(l) ortho- and para-toluene sulphochlorides, naphthalene sulphochlorides and other sulphochlorides of hydrocarbons, and quinoline sulphochlorides,
(m) halogen derivatives of substituted benzoylated chloranisol,
(n) halogen derivatives of ethers of aminophenols, and oxygen and nitrogen substitution derivatives thereof,
(o) ortho-oxymesityl chloride, piperonyl chloride and other halogen derivatives of pseudophenols, of methylene quinones and quinols,
(p) sulphochlorides of tertiary amines
(q) sulphochlorides of salicylic acid and chloro- and nitro-substitution products thereof, and sulphonamide,
(t) halogen derivatives of aromatic monocarboxylic acids,
(u) cyanogen halides, cyanuric halides and other halogen derivatives of cyanogen,
(v) halogen derivatives of nitrobenzene,
(x) urea halides, alkylurea halides, phenylurea halides and phenylalkylurea halides,
(y) phenyl-chlor-acetic acid and phenyl-chlorlactic acid and their homologues and other phenyl-halogen-fatty acids,
(z) halogen derivatives of pyridine, quinoline and iso-quinoline, and of other mono-heterocyclic ring compounds containing one nitrogen atom in a six-unit ring,
(a') halogen derivatives of phenyl olefine alcohols and of oxyphenyl olefine alcohols,
(b') ω-chlorostyrol or dichlorostyrol and other halogen derivatives of phenyl olefines,
(c') β-phenyl-propylene-glycol-α-chlorhydrin, benzyl-glycol-chlorhydrin, styrol dichloride and other halogen hydracid esters of phenyl glycols, thereafter forming the liquid mass containing the product of such action, into the shape of the desired artificial structure, and subjecting such shaped product to coagulation and plasticizing actions.

3. A process of manufacturing shaped artificial structures which comprises reacting upon viscose with a halogenated organic compound except a halohydrine or a halogen fatty acid, adapted to react with viscose to form a product which is soluble in an alkaline solution and which solution may be coagulated and the freshly coagulated structure plasticized in a bath having an acidity equivalent to $H_2SO_4$ of at least 35% to form a strong shaped artificial structure having an extensibility of at least about 8%.

LEON LILIENFELD.